(12) United States Patent
Park

(10) Patent No.: US 12,506,315 B2
(45) Date of Patent: Dec. 23, 2025

(54) LASER APPARATUS CAPABLE OF REPLACING LASER

(71) Applicant: Hulaser, INC., Seoul (KR)

(72) Inventor: In Bae Park, Boryeong-si (KR)

(73) Assignee: Hulaser, INC., Seoul (KR)

( * ) Notice: Subject to any disclaimer, the term of this patent is extended or adjusted under 35 U.S.C. 154(b) by 777 days.

(21) Appl. No.: 17/899,066

(22) Filed: Aug. 30, 2022

(65) Prior Publication Data

US 2024/0072505 A1 Feb. 29, 2024

(51) Int. Cl.
*H01S 3/02* (2006.01)
*A61B 18/20* (2006.01)

(52) U.S. Cl.
CPC .............. *H01S 3/025* (2013.01); *A61B 18/20* (2013.01); *A61B 2018/202* (2013.01); *A61B 2018/2023* (2017.05); *A61B 18/203* (2013.01)

(58) Field of Classification Search
CPC ....... H01S 3/025; A61B 18/20; A61B 18/203; A61B 2018/202; A61B 2018/2023; A61B 2018/00958
See application file for complete search history.

(56) References Cited

U.S. PATENT DOCUMENTS

| | | | |
|---|---|---|---|
| 2015/0209108 A1* | 7/2015 | Kim | A61B 18/203 606/9 |
| 2016/0184018 A1* | 6/2016 | Park | A61B 18/22 606/16 |
| 2022/0273399 A1* | 9/2022 | Lin | A61B 18/22 |

FOREIGN PATENT DOCUMENTS

| | | | | |
|---|---|---|---|---|
| CN | 204745390 U | * | 11/2015 | |
| KR | 100958212 B1 | * | 5/2010 | ............. A61B 18/22 |
| KR | 10-1158561 B1 | | 6/2012 | |
| KR | 101471884 B1 | * | 12/2014 | ........... A61B 18/203 |
| KR | 10-1677848 B1 | | 11/2016 | |
| KR | 102040935 B1 | * | 11/2019 | ............. H01R 24/60 |
| KR | 20210082862 A | * | 7/2021 | ............. A61B 18/22 |
| WO | WO-2021026997 A1 | * | 2/2021 | ............. A61N 5/067 |

\* cited by examiner

*Primary Examiner* — James A Menefee

(74) *Attorney, Agent, or Firm* — NKL Law; Jae Youn Kim

(57) ABSTRACT

Proposed is a laser apparatus capable of replacing laser wavelengths, and more specifically, a laser apparatus capable of replacing laser wavelengths that includes a plurality of laser output modules which output laser beams having different wavelengths from each other and enables a wavelength of an output laser beam to be changed by switching between the plurality of laser output modules. The laser apparatus capable of replacing laser wavelengths includes: a portable main body having a battery; a laser output module that is detachably coupled to the main body and outputs a laser beam; and a head cover that is detachably coupled to a front side of the laser output module by a magnetic force. The main body has a plurality of ball plungers, and the laser output module has one coupling location adjusting groove into which all of the plurality of ball plungers are inserted.

8 Claims, 11 Drawing Sheets

LASER APPARATUS CAPABLE OF REPLACING LASER

TECHNICAL FIELD

The present invention relates to a laser apparatus capable of replacing laser wavelengths, and more specifically, to a laser apparatus capable of replacing laser wavelengths that includes a plurality of laser output modules which output laser beams having different wavelengths from each other and enables a wavelength of an output laser beam to be changed by switching between the plurality of laser output modules.

BACKGROUND ART

A laser is applied to a wide range of fields such as the industrial field, the machining field, the medical field, the military field, and the measurement field. In particular, the laser is often used in the medical field since it enables an operation to be performed simply and with little pain. In the medical field, the laser is used in incision of the skin during an operation, blood coagulation at a bleeding site, peeling of the skin, hair removal, or the like.

Since the laser for operation or treatment is used without electricity, it does not damage the nerve, enables an operation to be performed on a patient having a bleeding tendency without fear, and enables a patient to have a minimized scar after an operation, being very useful in the medical field.

Korean Patent Registration No. 10-1158561 (Jun. 21, 2012) discloses a laser apparatus for dental treatment using a wavelength of 1440 nm. The laser apparatus for dental treatment in the related art uses a laser beam having a wavelength of 1440 nm which has high water absorption, thus enabling a root canal treatment and a hard tissue procedure to be performed. In this manner, a laser beam having a specific wavelength is used to perform a treatment or a procedure as necessary. However, the laser treatment apparatus for dental treatment in the related art can use only a laser beam having a specific wavelength.

Meanwhile, Korean Patent Registration No. 10-1677848 (Nov. 18, 2016) discloses a treatment device and a hand piece that can treat various blood vessel lesions exposed through the skin by selectively changing a wavelength and irradiating a laser beam to a lesion site of the skin.

However, a multi-wavelength laser treatment device and the hand piece in the related art includes a configuration of a hand piece 200 and a separate main body 100 having two or more laser output units 120 in order to change a wavelength of a laser beam and perform irradiation. In other words, since the multi-wavelength laser treatment device is used by connecting the hand piece 200 to the main body 100 having the two or more laser output units 120, the entire device is large in size, and it is not possible to separately carry or independently use only the hand piece 200.

SUMMARY OF INVENTION

Technical Problem

The invention is made to solve the above-described problems, and an object of the invention is to provide a laser apparatus capable of replacing laser wavelengths that can decrease in size and is portable and can switch to a laser beam having a wavelength suitable for a purpose of a procedure or treatment by selectively coupling and using a plurality of laser output modules that output laser beams having different wavelengths from each other.

Solution to Problem

In order to achieve the object, a laser apparatus capable of replacing laser wavelengths of the invention includes: a portable main body having a battery; a laser output module that is detachably coupled to the main body and outputs a laser beam; and a head cover that is detachably coupled to a front side of the laser output module by a magnetic force. The main body has a plurality of ball plungers, and the laser output module has one coupling location adjusting groove into which all of the plurality of ball plungers are inserted.

In the laser apparatus capable of replacing laser wavelengths, the coupling location adjusting groove may have a rectilinear shape. The plurality of ball plungers may be positioned in a row. Each of the ball plungers may have a plunger body having an opening portion, a spherical body which is inserted into the plunger body and is positioned at the opening portion, and an elastic body which supports the spherical body toward the opening portion.

The main body may have a latching groove and a coupling groove. The laser output module may have a latching projection at an upper portion, the latching projection being inserted into the latching groove. The laser output module may have a coupling projection at a rear side, the coupling projection being inserted into the coupling groove. The ball plungers may be provided in the coupling groove. The coupling location adjusting groove may be formed at an upper portion of the coupling projection.

The latching groove may have a first latching groove into which the latching projection is inserted, and a second latching groove which is formed to extend from the first latching groove and restricts a vertical movement of the latching projection when the latching projection moves horizontally toward a rear side.

The laser output module may include a laser output unit which generates a laser beam, an upper case and a lower case which are coupled to each other and covers the laser output unit, a front case which is coupled to a front side of the upper case and the lower case, and a ferrule which is coupled to a front side of the laser output unit and causes the laser beam to be output toward a front side of the head cover.

The head cover may have an attachment-detachment groove at a rear side, and an attachment bolt having a metal plate is coupled to the attachment-detachment groove. The front case may have a projecting portion at a front side, the projecting portion being inserted into the attachment-detachment groove, the front case may have a magnet assembling groove at a rear side, the magnet assembling groove being formed at a position corresponding to the projecting portion, and a first magnet generating an attraction force to the metal plate may be disposed in the magnet assembling groove.

A module cap may be coupled to the front side of the laser output unit, and a second magnet is disposed in the module cap. The front case may have a through-hole into which the module cap is inserted. The ferrule may be attached to the front side of the laser output unit by a magnetic force of the second magnet.

The laser output module may further include a module holder which is slidable in a frontward-rearward direction in the lower case. A slide knob which allows the module holder to move may be mounted on a lower portion of the lower case. The laser output unit may be mounted on an upper portion of the module holder and may move together with the module holder in the frontward-rearward direction.

The main body may have a first connection terminal at a front side, the first connection terminal being provided to transmit a signal and electric power to the laser output unit. A fixed PCB which is electrically connected to the laser output unit may be mounted on a rear side of the front case, and the fixed PCB has a second connection terminal at a rear side, the second connection terminal coming into electrical contact with the first connection terminal. The laser output unit may move in the frontward-rearward direction in a state of being electrically connected to the fixed PCB by an FPCB.

Advantageous Effects of Invention

A laser apparatus capable of replacing laser wavelengths of the invention can decrease in size, is portable, and can switch to a laser beam having a wavelength suitable for a purpose of a procedure or treatment by selectively coupling and using a plurality of laser output modules that output laser beams having different wavelengths from each other.

DESCRIPTION OF EMBODIMENTS

Figure 1:
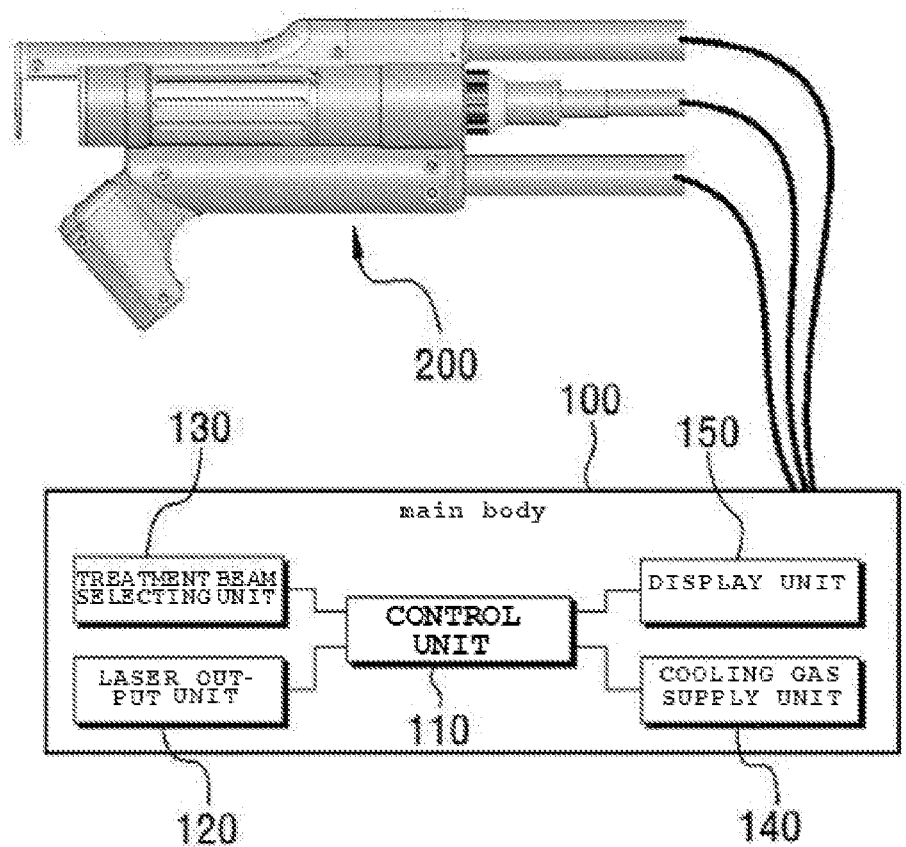
FIG. 1 is a diagram schematically illustrating a configuration of a multi-wavelength laser treatment apparatus in the related art.
Figure 2A:
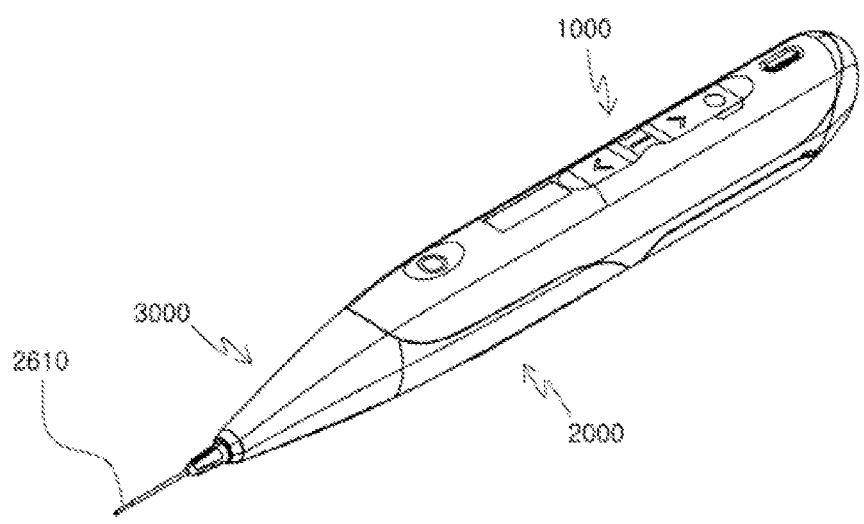
FIGS. 2A and 2B are perspective views of a laser apparatus capable of replacing laser wavelengths according to an embodiment of the invention.
Figure 2B:
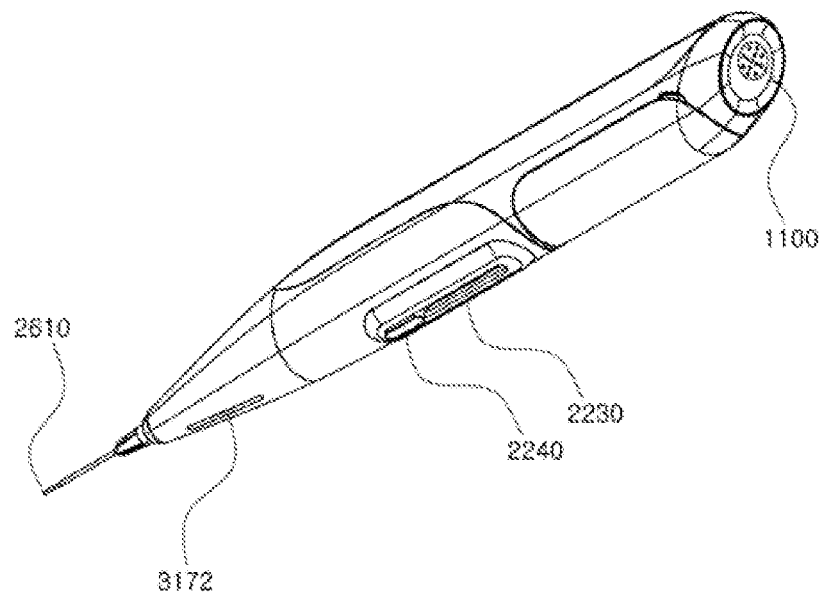

In FIG. 2A is a perspective view of a laser apparatus capable of replacing laser wavelengths according to an embodiment of the invention viewed from above at a front side, and FIG. 2B is a perspective view of the laser apparatus capable of replacing laser wavelengths according to the embodiment of the invention viewed from below at a rear side.

Figure 3A:
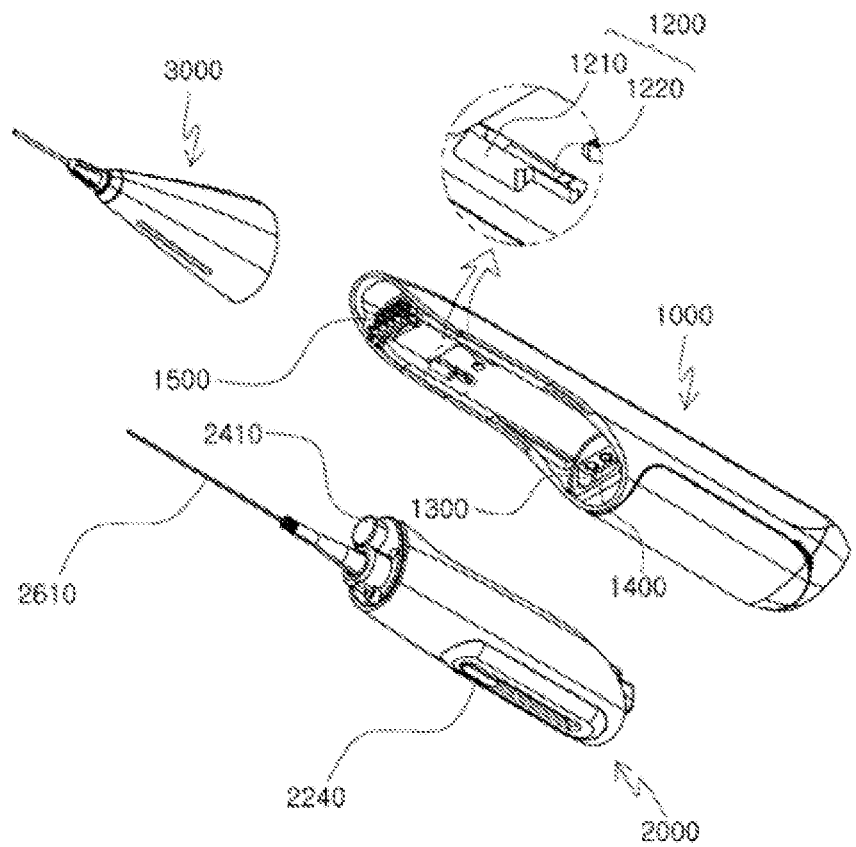
FIGS. 3A and 3B are exploded perspective views of the laser apparatus capable of replacing laser wavelengths according to the embodiment of the invention viewed from below at a front side.
Figure 4:
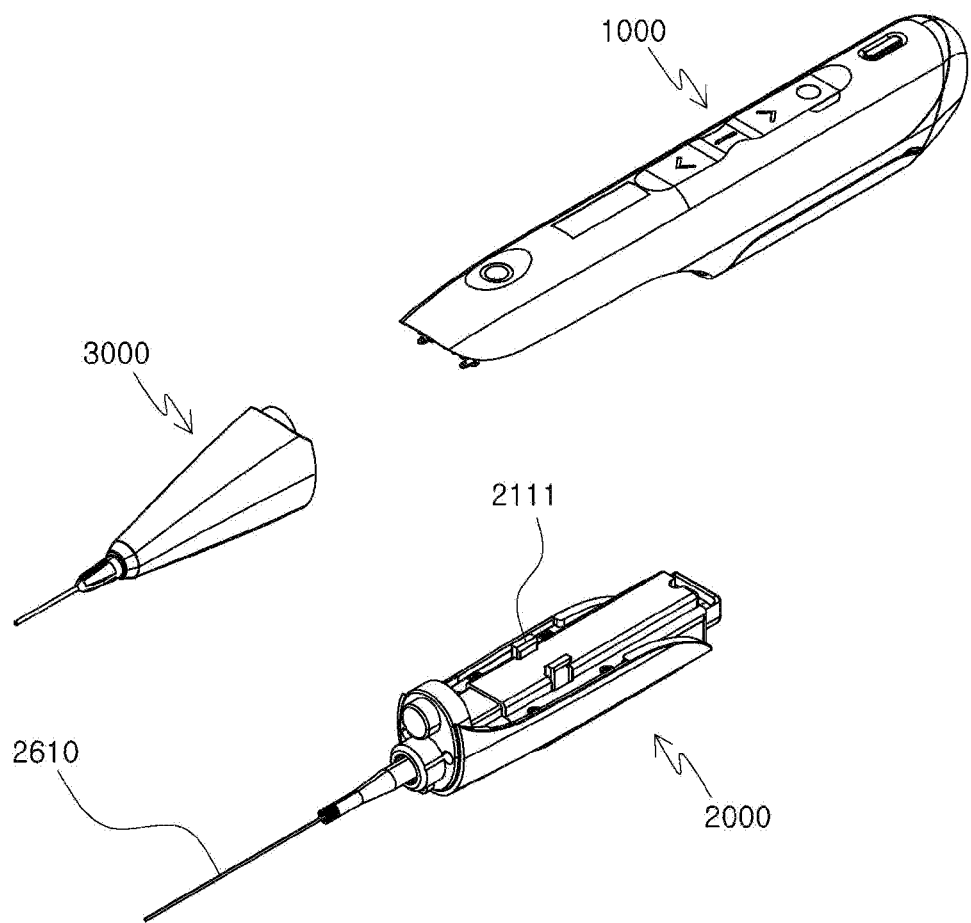
FIG. 4 is an exploded perspective view of the laser apparatus capable of replacing laser wavelengths according to the embodiment of the invention viewed from above at the front side.

FIG. 3A is an exploded perspective view of the laser apparatus capable of replacing laser wavelengths according to the embodiment of the invention viewed from below at the front side, and (b) of FIG. 4 is a longitudinal sectional view of a ball plunger.

Figure 7A:
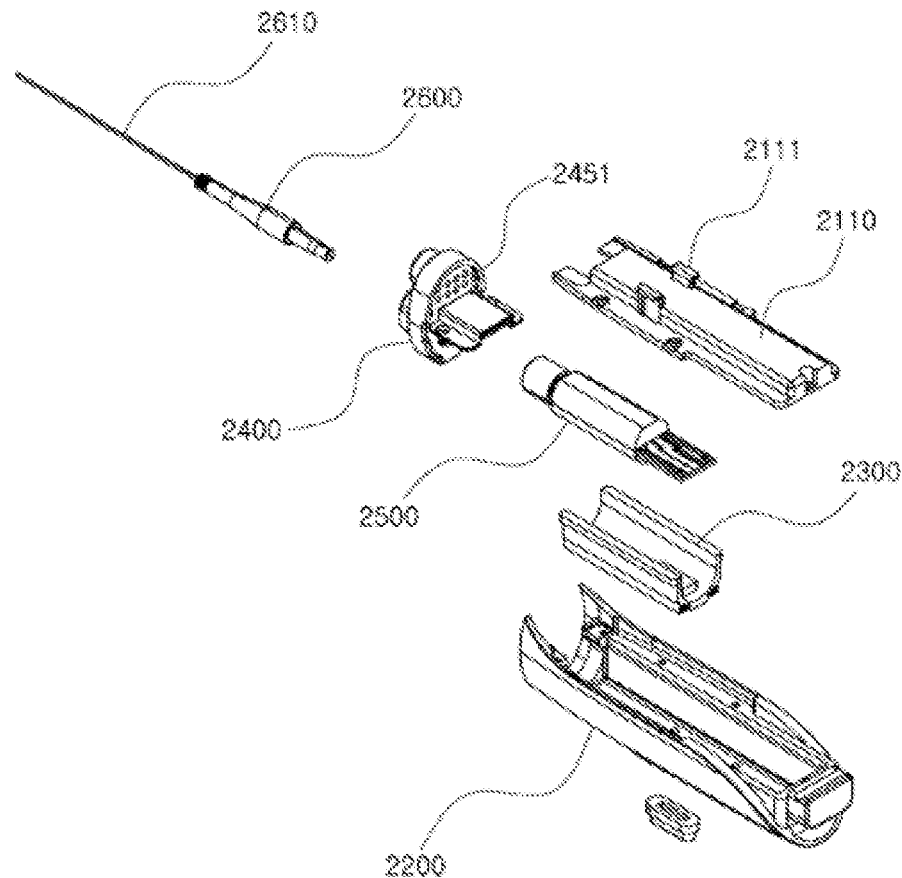
FIGS. 7A and 7B are exploded perspective views of the laser output module according to the embodiment of the invention viewed from above at a rear side.
Figure 7B:
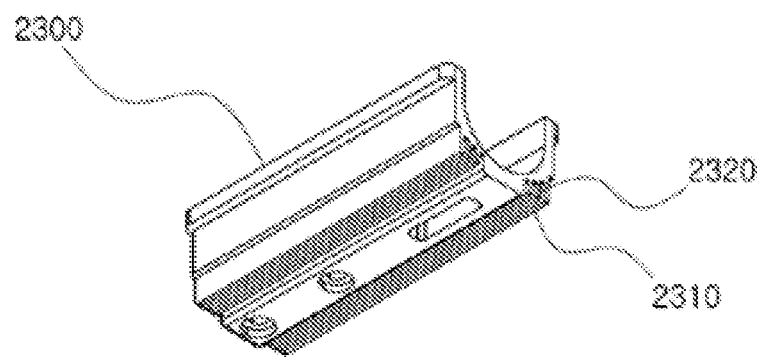

In FIG. 7A is an exploded perspective view of a laser output module according to the embodiment of the invention viewed from above at a rear side, and FIG. 7B is a perspective view illustrating a module holder separately.

Figure 8A:
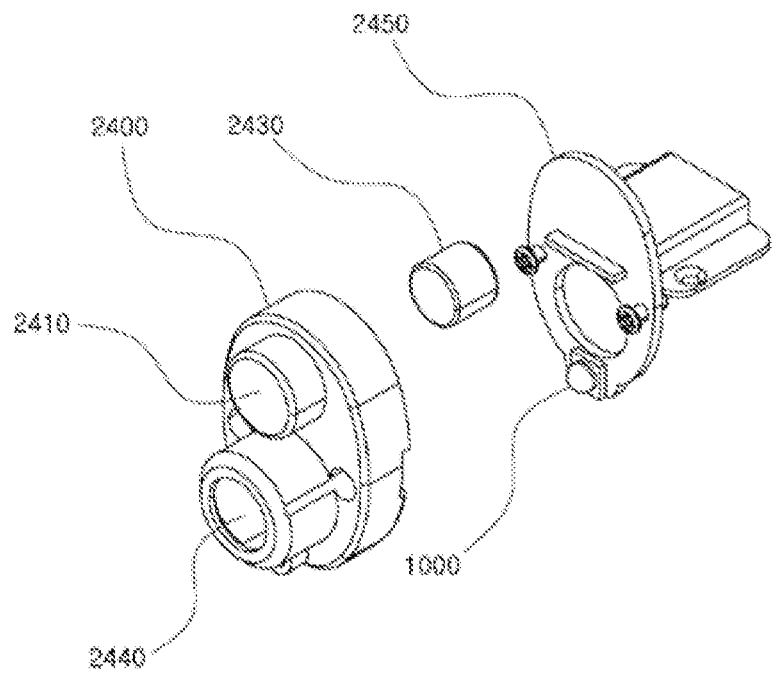
FIGS. 8A and 8B are exploded perspective views of a front case according to the embodiment of the invention.
Figure 8B:
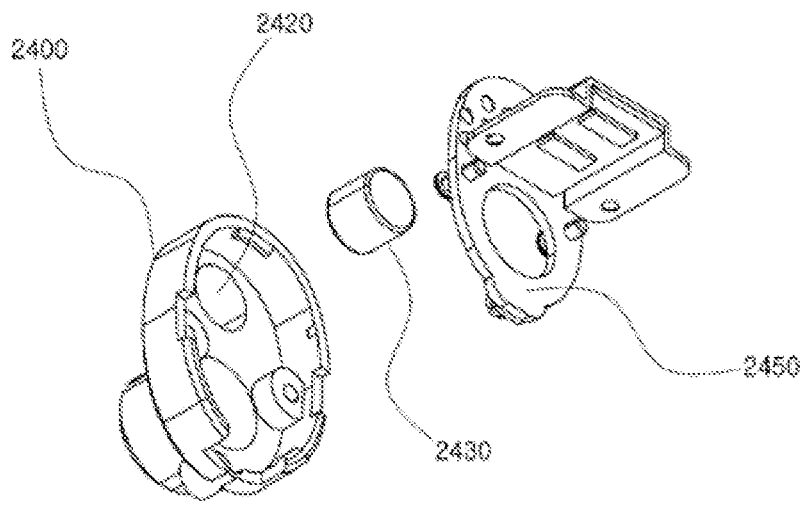

In FIG. 8A is an exploded perspective view of a front case according to the embodiment of the invention viewed from above at a front side, and FIG. 8B is an exploded perspective view of the front case according to the embodiment of the invention viewed from below at a rear side.

Figure 10A:
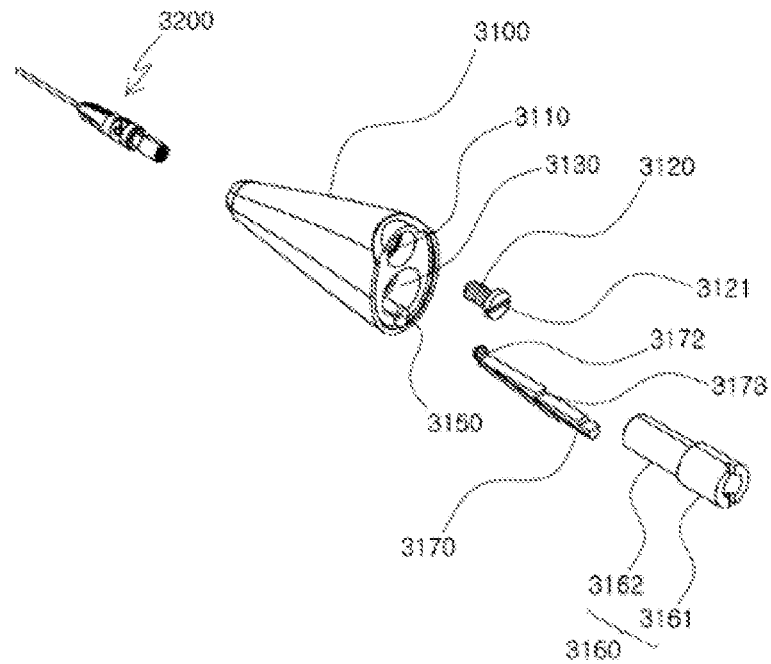
FIGS. 10A and 10B are exploded perspective views of a head cover according to the embodiment of the invention.
Figure 10B:
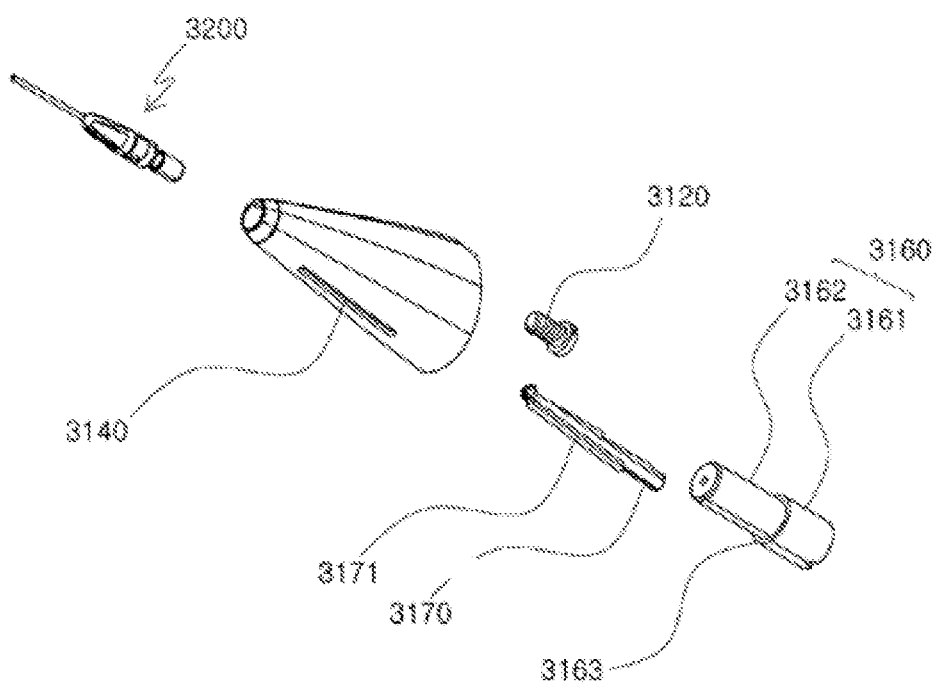

In FIG. 10A is an exploded perspective view of the head cover according to the embodiment of the invention viewed from above at a rear side, and FIG. 10B is an exploded perspective view of the head cover according to the embodiment of the invention viewed from below at a front side.

Figure 11A:
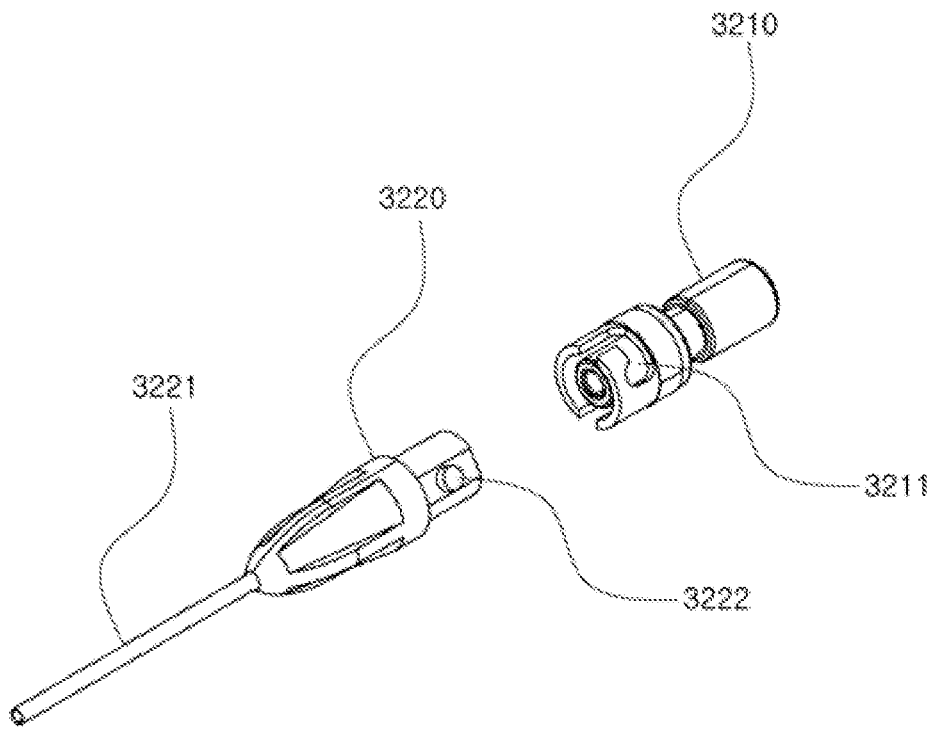
FIGS. 11A and 11B are perspective views of a tip unit according to the embodiment of the invention.
Figure 11B:
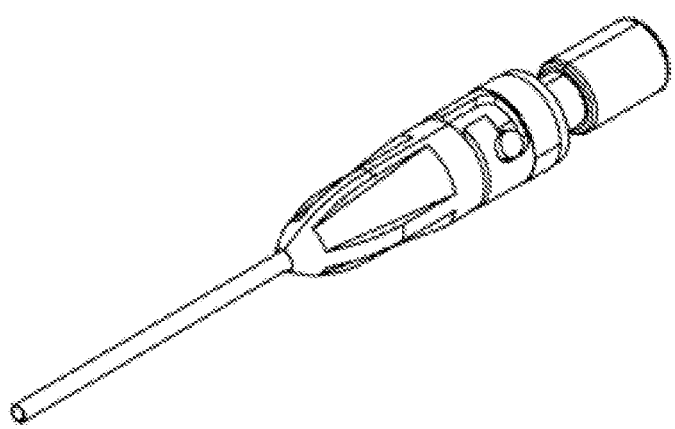

In FIG. 11A is a perspective view of a state before coupling of a tip unit according to the embodiment of the invention, FIG. 11B is a perspective view of a state after coupling of the tip unit according to the embodiment of the invention.

DESCRIPTION OF EMBODIMENTS

Hereinafter, the invention will be described in detail with reference to the accompanying drawings.

The laser apparatus capable of replacing laser wavelengths according to the embodiment of the invention includes a main body 1000, a laser output module 2000 that is detachably coupled to the main body 1000, and a head cover 3000, as illustrated in FIGS. 2A-2B to 11A-11B. The laser output module 2000 is configured of a plurality of laser output modules which output laser beams having different wavelengths from each other, and any one laser output module of the plurality of laser output modules can be selectively coupled and used as necessary.

The main body 1000 has a battery (not illustrated) and supplies electric power to the laser output module 2000 which is coupled to a lower portion of the main body. As illustrated in FIG. 2A-B, the main body 1000 has a button at an upper portion, the button being provided to operate the laser output module 2000 or control various types of functions. In addition, the main body 1000 has a speaker 1100 at a rear side thereof.

As illustrated in FIG. 3A, the main body 1000 has a latching groove 1200 and a coupling groove 1300 which are provided for the main body to be coupled to the laser output module 2000. The laser output module 2000 has a latching projection 2111 which is inserted into the latching groove 1200 and a coupling projection 2210 which is inserted into the coupling groove 1300. The latching groove 1200 includes a first latching groove 1210 and a second latching groove 1220. The first latching groove 1210 has an open lower portion, and the second latching groove 1220 is formed to extend at a rear side of the first latching groove 1210 and restricts a vertical movement of the laser output module 2000.

Figure 3B:
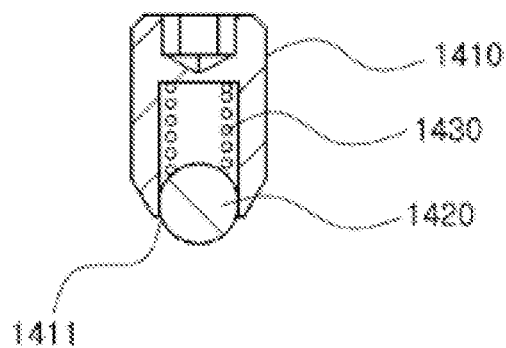

Three ball plungers 1400 are provided in the coupling groove 1300. As illustrated in FIG. 3B, a ball plunger 1400 is configured to have a plunger body 1410, a spherical body 1420, and an elastic body 1430. The plunger body 1410 is formed in a cylindrical shape and has an opening portion 1411 at one end. Further, the spherical body 1420 and the elastic body 1430 are inserted into the plunger body 1410.

The spherical body 1420 has a diameter larger than a diameter of the opening portion 1411, and the elastic body 1430 pushes the spherical body 1420 toward the opening portion 1411. Hence, the spherical body 1420 is positioned at the opening portion 1411. In the embodiment of the invention, the elastic body 1430 is a coil spring. In the embodiment of the invention, the three ball plungers 1400 are positioned in a row.

Further, the main body 1000 has a first connection terminal 1500 at a front side thereof, the first connection terminal 1500 being provided to supply a signal and electric power to a laser output unit 2500 of the laser output module 2000.

Figure 5:
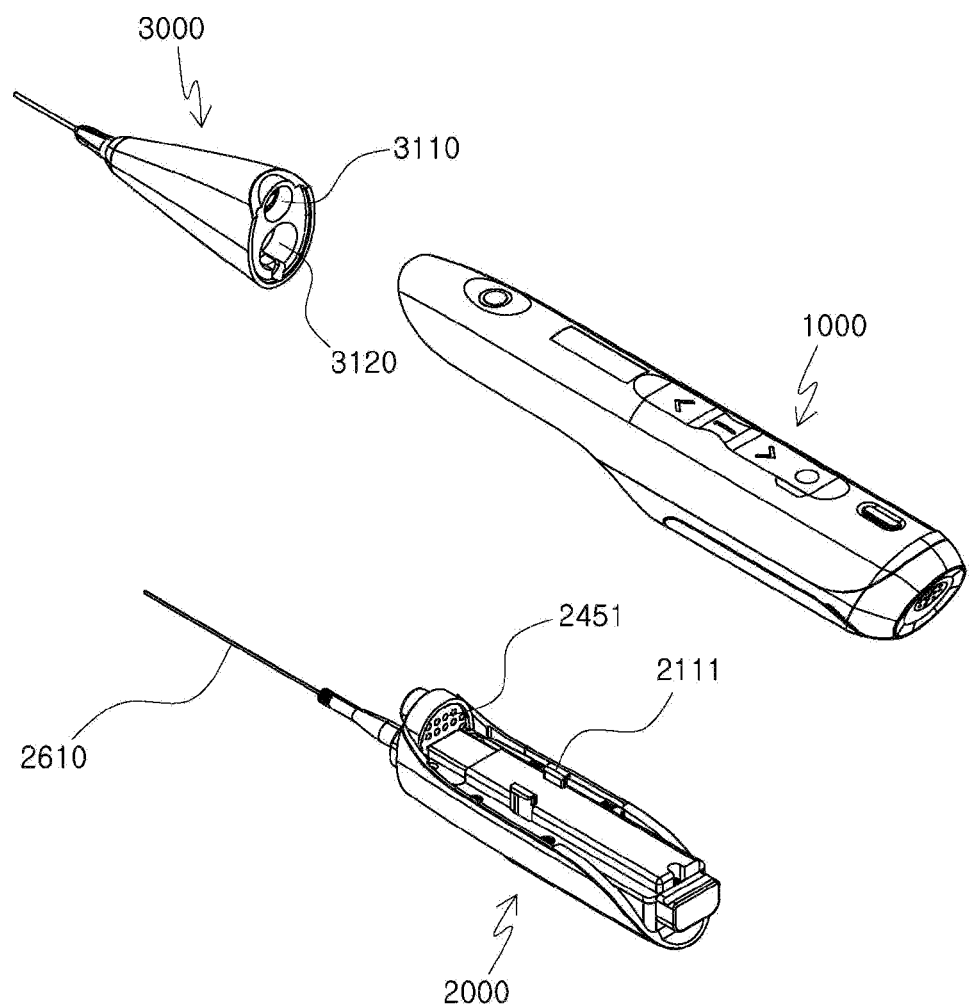
FIG. 5 is an exploded perspective view of the laser apparatus capable of replacing laser wavelengths according to the embodiment of the invention viewed from above at a rear side.

As illustrated in FIGS. 4 and 5, the laser output module 2000 is detachably coupled to the main body 1000 and outputs a laser beam. The laser output module 2000 includes an upper case 2100, a lower case 2200, a module holder 2300, a front case 2400, the laser output unit 2500, and a ferrule 2600.

Figure 6:
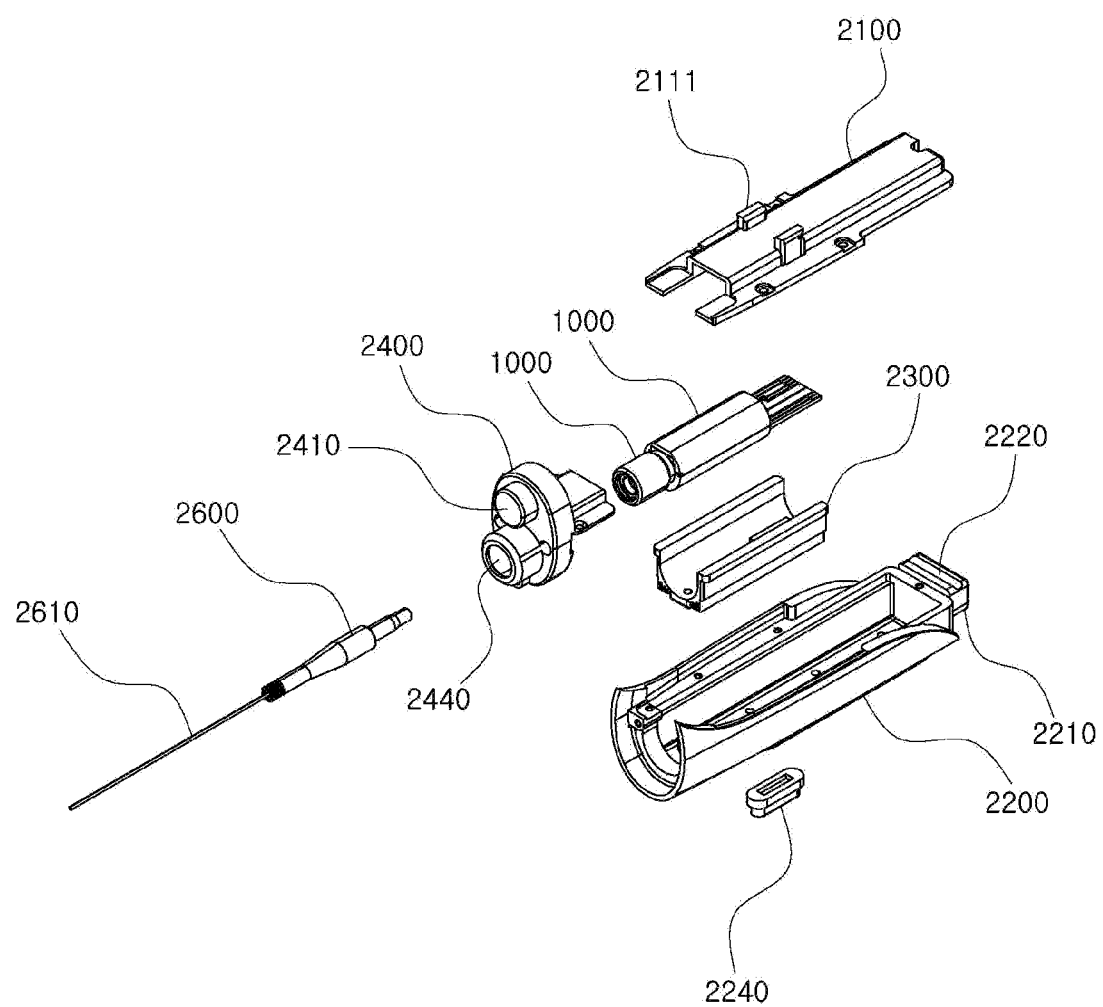
FIG. 6 is an exploded perspective view of a laser output module according to the embodiment of the invention viewed from above at a front side.

As illustrated in FIG. 6, the upper case 2100 is coupled to the lower case 2200, and the laser output unit 2500 is positioned inside the upper case 2100 and the lower case 2200. The upper case 2100 has the latching projection 2111 at an upper portion thereof, the latching projection 2111 being inserted into the latching groove 1200. In other words, the laser output module 2000 has the latching projection 2111 at an upper portion thereof. The latching projection 2111 is inserted into a lower portion of the first latching groove 1210 and then moves horizontally toward a rear side to be inserted into the second latching groove 1220, and thereby a vertical movement of the latching projection 2111 is restricted. In this manner, the latching projection 2111 is inserted into the latching groove 1200, and thereby the vertical movement of the laser output module 2000 which is coupled to a lower portion of the main body 1000 is restricted.

The lower case 2200 has the coupling projection 2210 at a rear side thereof, the coupling projection 2210 being inserted into the coupling groove 1300. In other words, the laser output module 2000 has the coupling projection 2210 at a rear side thereof. The coupling projection 2210 has one coupling location adjusting groove 2220 at an upper portion thereof. The coupling location adjusting groove 2220 is formed in a rectilinear shape, and the three ball plungers 1400 are all inserted thereinto. Specifically, in a process of inserting the coupling projection 2210 into the coupling groove 1300, the spherical body 1420 is inserted into the plunger body 1410 by the coupling projection 2210 to compress the elastic body 1430, and the spherical body 1420 is inserted into the coupling location adjusting groove 2220 due to the elastic force of the elastic body 1430 when the coupling location adjusting groove 2220 reaches a lower portion of the ball plunger 1400. Hence, the laser output module 2000 is coupled to a designated position of the main body 1000 with accuracy. In addition, since the three ball plungers 1400 are all inserted into the coupling location adjusting groove 2220 having the rectilinear shape, the laser output module 2000 can be coupled to the main body 1000 straightly without being twisted when the laser output module 2000 is coupled to the main body 1000. Further, the lower case 2200 has a slide groove 2230 at a lower portion, and a slide knob 2240 is mounted on the slide groove 2230. The slide knob 2240 is movable along the slide groove 2230 in a forward-rearward direction along by an operation of a user. The user can move the module holder 2300 in the frontward-rearward direction by using the slide knob 2240.

The module holder 2300 is slidable in the frontward-rearward direction in the lower case 2200. As described above, the module holder 2300 is connected to the slide knob 2240 to move in the frontward-rearward direction by a user, and the laser output unit 2500 is mounted on an upper portion of the module holder 2300. In this manner, the laser output unit 2500 moves together with the module holder 2300 in the frontward-rearward direction. As illustrated in FIG. 7B, the module holder 2300 has a plurality of support projections 2310 at a lower portion thereof, and spacing grooves 2320 are formed between the plurality of support projections 2310. As described above, the support projections 2310 and the spacing grooves 2320 are formed at the lower portion of the module holder 2300, and thereby the module holder 2300 can be slidable stably and smoothly by reducing resistance and friction while sliding.

The front case 2400 is coupled to a front side of the upper case 2100 and the lower case 2200. As illustrated in FIG. 8A, the front case 2400 has a projecting portion 2410 at a front side thereof. The projecting portion 2410 is inserted into an attachment-detachment groove 3110 formed at the head cover 3000. Further, as illustrated in FIG. 8B, the front case 2400 has a magnet assembling groove 2420 at a rear side thereof, the magnet assembling groove 2420 being formed at a position corresponding to the projecting portion 2410. A first magnet 2430 is disposed in the magnet assembling groove 2420. A magnetic force of the first magnet 2430 causes the head cover 3000 to be attached to the front case 2400.

As illustrated in FIG. 8A, the front case 2400 has a through-hole 2440. The ferrule 2600 is coupled to the laser output unit 2500 through the through-hole 2440. Further, a fixed PCB 2450 which is electrically connected to the laser output unit 2500 is mounted on a rear side of the front case 2400. The fixed PCB 2450 and the laser output unit 2500 are connected to each other by an FPCB (not illustrated). Hence, the laser output unit 2500 can move in the frontward-rearward direction in a state of being electrically connected to the fixed PCB 2450. Further, an led lamp 2452 is positioned at a lower front portion of the front case 2400. Specifically, the led lamp 2452 is mounted on the fixed PCB 2450 and is exposed to the front side of the front case 2400.

The fixed PCB 2450 has a second connection terminal 2451, which comes into electrical contact with the first connection terminal 1500, at a rear side (refer to FIG. 7A). As described above, since the ball plungers 1400 and the coupling location adjusting groove 2220 causes the laser output module 2000 to be constantly coupled to an appropriate position of the main body 1000, a stable contact state of the first connection terminal 1500 and the second connection terminal 2451 can be maintained.

Figure 9:
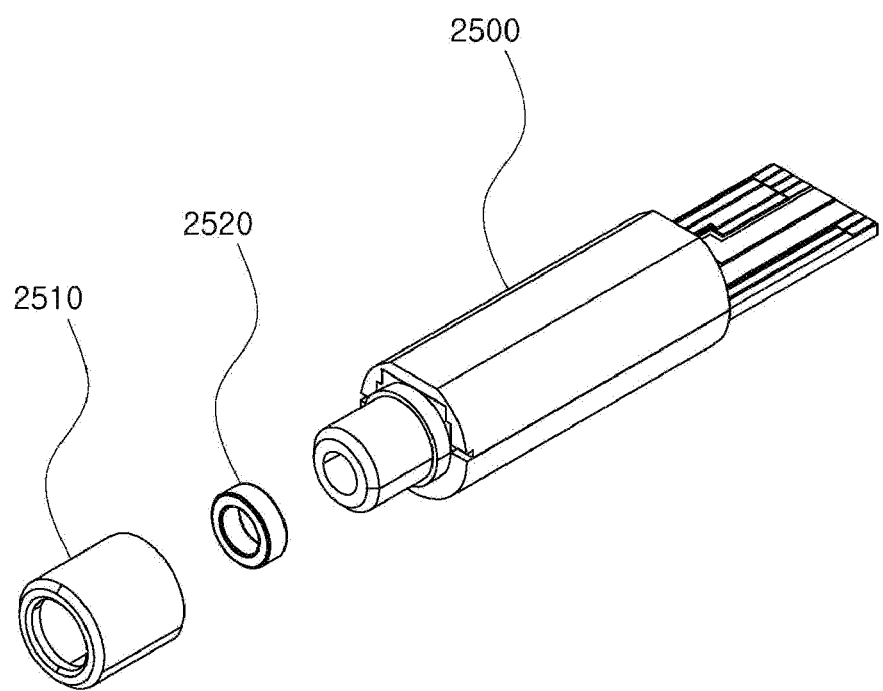
FIG. 9 is an exploded perspective view of a laser output unit according to the embodiment of the invention.

The laser output unit 2500 generates a laser beam. As described above, the laser output unit 2500 is positioned inside the upper case 2100 and the lower case 2200. Further, the laser output unit 2500 is positioned at an upper portion of the module holder 2300 and can move in the frontward-rearward direction with an operation of the slide knob 2240 by a user. As illustrated in FIG. 9, a module cap 2510 is coupled to the front side of the laser output unit 2500, and a second magnet 2520 is disposed in the module cap 2510. The second magnet 2520 is formed in a ring shape such that the ferrule 2600 can be inserted into a central portion of the second magnet 2520. The module cap 2510 is inserted into the through-hole 2440 formed at the front case 2400. The laser output unit 2500 can be detached from the module holder 2300 and can be switched to another laser output unit 2500 having a different wavelength, or another laser output unit 2500 can be mounted.

The ferrule 2600 is coupled to a front side of the laser output unit 2500 and causes a laser beam to be output toward a front side of the head cover 3000. In other words, the ferrule 2600 is inserted into the module cap 2510 through the through-hole 2440 and is attached to the front side of the laser output unit 2500 by a magnetic force of the second magnet 2520. The ferrule 2600 includes an optical fiber 2610 which projects toward the front side, and a laser beam generated from the laser output unit 2500 is output through the optical fiber 2610 toward the front side of the head cover 3000.

The head cover 3000 is detachably coupled to a front side of the laser output module 2000 by the magnetic force of the first magnet 2430. The head cover 3000 includes a cap unit 3100 and a tip unit 3200.

As illustrated in FIG. 10A, the cap unit 3100 has the attachment-detachment groove 3110 at a rear side thereof, and an attachment bolt 3120 having a metal plate 3121 is coupled to the attachment-detachment groove 3110. In this manner, the projecting portion 2410 formed at the front case 2400 is inserted into the attachment-detachment groove 3110 to which the attachment bolt 3120 is coupled. In other words, when the head cover 3000 is coupled to the front side of the laser output module 2000, the projecting portion 2410 is inserted into the attachment-detachment groove 3110, and an attraction force is generated between the magnetic force of the first magnet 2430 and the metal plate 3121 such that the head cover 3000 is attached to the front side of the laser output module 2000.

Further, the cap unit 3100 has a fixing groove 3130 at a rear side thereof, and the cap unit 3100 has a lamp hole 3140 at a lower portion thereof. The fixing groove 3130 is formed below the attachment-detachment groove 3110, and a fitting groove 3150 is formed between the fixing groove 3130 and the lamp hole 3140. An elastic fixing unit 3160 is inserted into the fixing groove 3130, and a light projecting unit 3170 is inserted into the fitting groove 3150.

The elastic fixing unit 3160 is inserted into and fixed to the fixing groove 3130 and fulfills a function of fixing the light projecting unit 3170 which is inserted into the fitting groove 3150. The elastic fixing unit 3160 is formed in a hollow cylindrical shape, and the optical fiber 2610 penetrates a central portion of the elastic fixing unit 3160. The elastic fixing unit 3160 has a first fixing portion 3161 and a second fixing portion 3162. The first fixing portion 3161 is formed to have a diameter larger than that of the second fixing portion 3162, and a latching step 3163 is formed between the first fixing portion 3161 and the second fixing portion 3162.

The light projecting unit 3170 is inserted into the fitting groove 3150 and has a light emitter 3171 formed to project from a lower portion of the light projecting unit 3170. The light emitter 3171 is inserted into the lamp hole 3140. Further, the light projecting unit 3170 has a first step 3172 and a second step 3173 at an upper portion thereof. The first step 3172 is formed at a forward side than the second step 3173. As the elastic fixing unit 3160 is inserted into and fixed to the fixing groove 3130, the first step 3172 is pressed toward the front side by the second fixing portion 3162 and the second step 3173 is pressed to the front side by the latching step 3163 to be fixed. Further, when the head cover 3000 is coupled to the front side of the main body 1000 and the laser output module 2000, the light projecting unit 3170 is located at a front side of the led lamp 2452, and light of the led lamp 2452 is emitted through the light emitter 3171.

As illustrated in FIG. 11A-B, the tip unit 3200 has a tip body 3210 which is coupled to the cap unit 3100 and a tip head 3220 which is coupled to the tip body 3210. The tip body 3210 has a bent groove 3211. Further, a compressive coil spring (not illustrated) is inserted into the tip body 3210. The tip head 3220 has a cannula 3221 into which the optical fiber 2610 is inserted and which projects toward the front side. In addition, the tip head 3220 has a fixing pin 3222 which is formed to project so as to be inserted into the bent groove 3211. When the tip head 3220 is inserted into and coupled to the tip body 3210, the compressive coil spring is compressed by the tip head 3220, and the fixing pin 3222 moves along the bent groove 3211 and is located at an innermost end of the bent groove 3211. In this manner, the tip head 3220 is not detached from the tip body 3210 and a coupling state thereof is maintained. On the other hand, when the tip head 3220 is rotated to move the fixing pin 3222 by a certain distance, an elastic force of the coil spring causes the tip head 3220 to be detached.

The laser apparatus capable of replacing laser wavelengths according to the invention is not limited to the embodiment described above and can be variously modified within the scope of the technical ideas of the invention.

The invention claimed is:

1. A laser apparatus capable of replacing laser wavelengths comprising:
   a portable main body having a battery;
   a laser output module that is detachably coupled to the main body and outputs a laser beam; and
   a head cover that is detachably coupled to a front side of the laser output module by a magnetic force,
   wherein the main body has a plurality of ball plungers, and
   wherein the laser output module has one coupling location adjusting groove into which all of the plurality of ball plungers are inserted.

2. The laser apparatus capable of replacing laser wavelengths according to claim 1,
   wherein the coupling location adjusting groove has a rectilinear shape,
   wherein the plurality of ball plungers are positioned in a row,
   wherein each of the ball plungers has
     a plunger body having an opening portion,
     a spherical body which is inserted into the plunger body and is positioned at the opening portion, and
     an elastic body which supports the spherical body toward the opening portion.

3. The laser apparatus capable of replacing laser wavelengths according to claim 1,
   wherein the main body has a latching groove and a coupling groove,
   wherein the laser output module has a latching projection at an upper portion, the latching projection being inserted into the latching groove,
   wherein the laser output module has a coupling projection at a rear side, the coupling projection being inserted into the coupling groove,
   wherein the ball plungers are provided in the coupling groove, and
   wherein the coupling location adjusting groove is formed at an upper portion of the coupling projection.

4. The laser apparatus capable of replacing laser wavelengths according to claim 3, wherein the latching groove has
a first latching groove into which the latching projection is inserted, and
a second latching groove which is formed to extend from the first latching groove and restricts a vertical movement of the latching projection when the latching projection moves horizontally toward a rear side.

5. The laser apparatus capable of replacing laser wavelengths according to claim 1,
wherein the laser output module includes
a laser output unit which generates a laser beam,
an upper case and a lower case which are coupled to each other and covers the laser output unit,
a front case which is coupled to a front side of the upper case and the lower case, and
a ferrule which is coupled to a front side of the laser output unit and causes the laser beam to be output toward a front side of the head cover,
wherein the head cover has an attachment-detachment groove at a rear side, and an attachment bolt having a metal plate is coupled to the attachment-detachment groove, and
wherein the front case has a projecting portion at a front side, the projecting portion being inserted into the attachment-detachment groove, the front case has a magnet assembling groove at a rear side, the magnet assembling groove being formed at a position corresponding to the projecting portion, and a first magnet generating an attraction force to the metal plate is disposed in the magnet assembling groove.

6. The laser apparatus capable of replacing laser wavelengths according to claim 5,
wherein a module cap is coupled to the front side of the laser output unit, and a second magnet is disposed in the module cap,
wherein the front case has a through-hole into which the module cap is inserted, and
wherein the ferrule is attached to the front side of the laser output unit by a magnetic force of the second magnet.

7. The laser apparatus capable of replacing laser wavelengths according to claim 5,
wherein the laser output module further includes a module holder which is slidable in a frontward-rearward direction in the lower case,
wherein a slide knob which allows the module holder to move is mounted on a lower portion of the lower case, and
wherein the laser output unit is mounted on an upper portion of the module holder and moves together with the module holder in the frontward-rearward direction.

8. The laser apparatus capable of replacing laser wavelengths according to claim 7,
wherein the main body has a first connection terminal at a front side, the first connection terminal being provided to transmit a signal and electric power to the laser output unit,
wherein a fixed PCB which is electrically connected to the laser output unit is mounted on a rear side of the front case, and the fixed PCB has a second connection terminal at a rear side, the second connection terminal coming into electrical contact with the first connection terminal, and
wherein the laser output unit moves in the frontward-rearward direction in a state of being electrically connected to the fixed PCB by an FPCB.

* * * * *